United States Patent Office 2,911,844
Patented Nov. 10, 1959

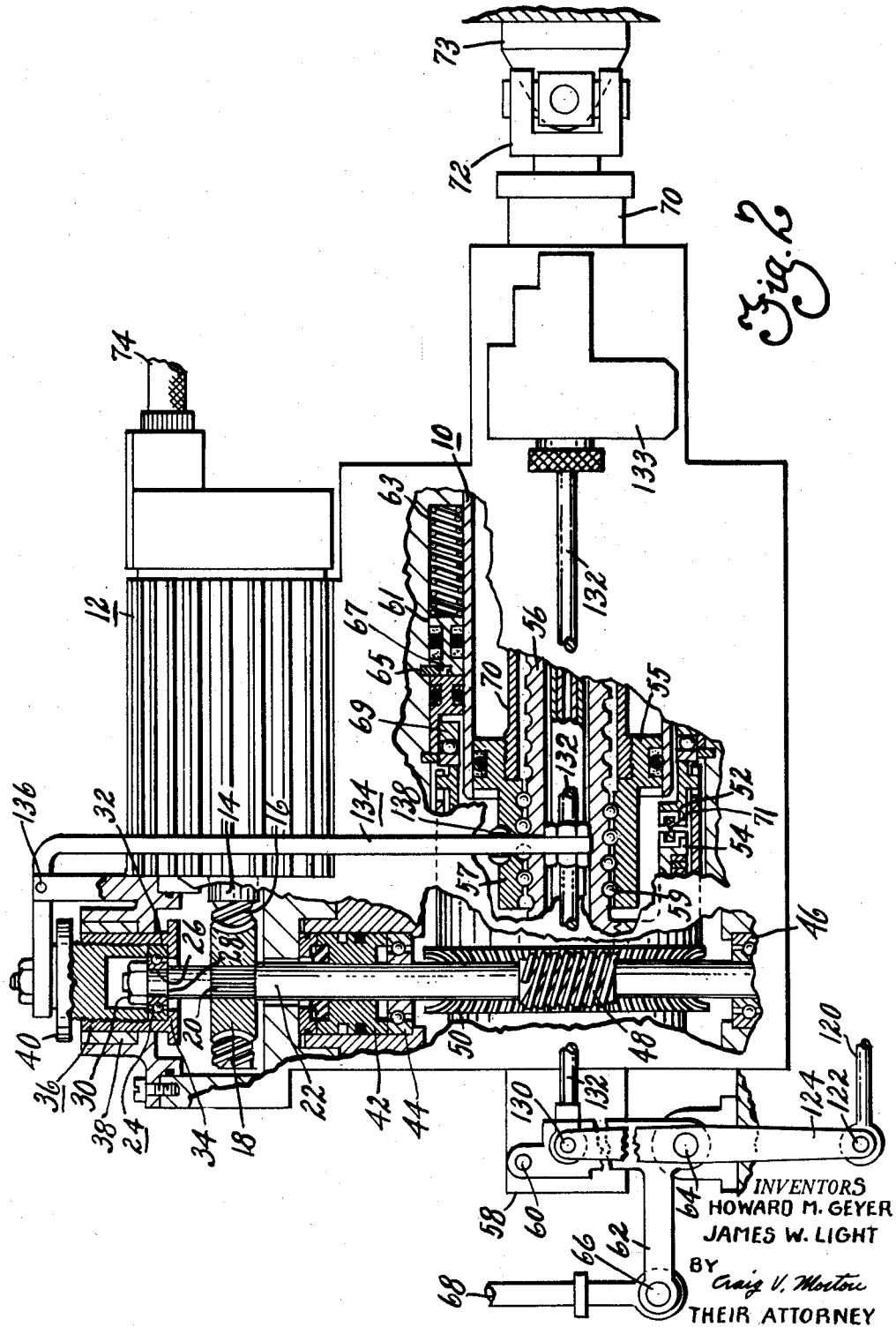

2,911,844

ACTUATOR WITH LOAD FEEDBACK MEANS

Howard M. Geyer, Dayton, and James W. Light, Greenville, Ohio, assignors to General Motors Corporation, Detroit, Mich., a corporation of Delaware Application September 9, 1954, Serial No. 454,957

6 Claims. (Cl. 74—388)

This invention pertains to actuators, and particularly to electric motor driven actuators.

Heretofore, electric actuators with proportional control have been developed. One way of accomplishing proportional control is disclosed in copending application, Serial No. 410,982, filed February 17, 1954, in the name of Howard M. Geyer et al., now Patent No. 2,810,256, wherein the degree of electric motor energization, is controlled by a carbon pile. In this type of arrangement, the rate of actuator travel is proportional to the displacement of a manually operable control member. The present invention constitutes an improvement over the aforementioned application by including load feedback means which enable the operator to feel, or sense, the magnitude, as well as the type, aiding or opposing, of the load which is being moved by the actuator. This "feel" is of particular importance in aircraft actuator installations since it is the only practical manner in which proportional "feel" can be transmitted to the pilot's control lever. Moreover, this sense of feel constitutes a safety feature which may well prevent a serious mishap that might otherwise occur if the pilot has no sense of feel. Accordingly, among our objects are the provision of an actuator including load feedback means; the further provision of an actuator including means for transmitting proportional feel of the load to a manually operable control member; and the still further provision of an electric motor driven actuator including proportional control means and load feedback means.

The aforementioned and other objects are accomplished in the present invention by the provision of means whereby the operator must exert effort proportional to the actuator load to effect actuator operation. Specifically, the present invention is incorporated in an actuator of the type shown in the Geyer Patent 2,620,683. This type of actuator includes a cylinder having disposed therein a reciprocable piston. The piston is operatively connected to a rotatable member, or screw shaft, such that piston reciprocation is dependent upon rotation of the screw shaft. Moreover, the actuator is of the dual drive type, i.e., the piston may be reciprocated by either fluid under pressure or by rotation of the screw shaft by auxiliary means, such as a reversible electric motor. In addition, the actuator includes locking means constituted by a toothed clutch which is operable to restrain rotation of the screw shaft when the actuator is inactive. However, it is to be understood that the load feedback embodiment disclosed herein is only exemplary, as this mechanism could be incorporated in an electromechanical actuator of the type shown in the Geyer Patent No. 2,642,752.

Either the actuator piston or the cylinder may be attached to a movable load device. However, in the instant embodiment, the cylinder is connected to the load device and the piston is connected to a fixed support. Thus, the cylinder will reciprocate relative to the piston. The cylinder carries a control valve housing and a pair of spaced contacts for controlling motor energization. The stationary contacts are engageable by a contact operatively connected by a manually positionable rod, which is also connected to a valve disposed within the valve housing for controlling fluid pressure operation of the actuator. The manually positionable rod may be adjusted by a control lever through a carbon pile assembly, as disclosed in the aforementioned application, so as to effect proportional energization of the electric motor.

The load feedback means of the present invention include a bellcrank which carries the aforementioned rod positioned contact adjacent one end thereof. The bellcrank is pivotally supported intermediate its ends on the cylinder housing, the other end of the bellcrank being operatively connected with the electric motor driven gear train for effecting rotation of the actuator screw shaft. The gear train includes force multiplying means in the form of reduction gearing including a worm and worm gear. Thus, in order to energize the electric motor, the operator must exert sufficient force, in the case of an opposing load, to manually rotate the screw shaft through a small angular distance. This arrangement affords a sense of proportional load feel, since the screw shaft is operatively connected to the piston and is rotatably supported within the cylinder. Moreover, the operator must continually exert this predetermined force to maintain motor energization since the cylinder carried contacts operate in a follow-up manner with respect to the bellcrank carried contact. Conversely, with an assisting load, the operator must continually exert a proportional load force of opposite sense on the control lever to control actuator operation.

Further objects and advantages of the present invention will be apparent from the following description, reference being had to the accompanying drawing wherein a preferred embodiment of the present invention is clearly shown.

In the drawings:

Figure 2 is a view, partly in section and partly in elevation, with certain parts broken away of an actuator constructed according to the present invention.

Figure 1:
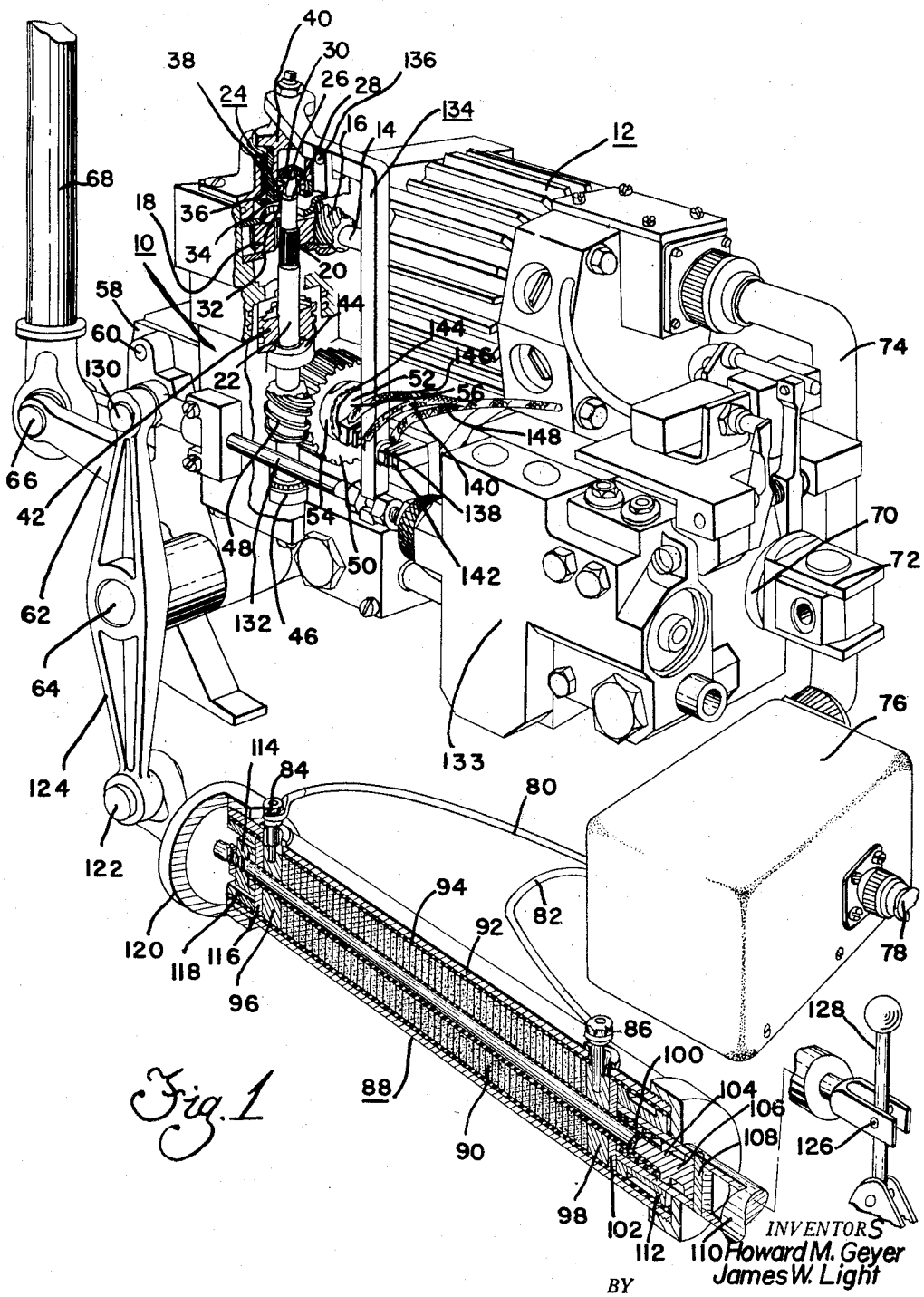
Figure 1 is a fragmentary view, partly in section and partly in elevation, of an actuator embodying the present invention.

With particular reference to the drawings an actuator of the type shown in the aforementioned Patent 2,620,683 is disclosed. The actuator includes a cylinder assembly 10 having attached thereto a reversible electric motor 12. The electric motor 12 is connected to a shaft 14, which has affixed thereto a worm 16. The worm 16 meshes with a worm gear 18, which is splined at 20 to a rotatable and axially movable shaft 22. The upper end of the shaft 22, as viewed in the drawings is supported by a thrust ball bearing assembly 24, the inner race 26 of which is disposed between a shoulder 28 on the shaft and a nut 30, which is attached to the end of the shaft. The outer race 32 of the thrust ball bearing assembly 24 is disposed between a flange 34 formed on a collar 36, which is slidably supported in the actuator cylinder by a sleeve bearing 38, and a member 40 which threadedly engages the collar 36.

The shaft 22 extends through a seal ring assembly 42, which abuts a ball bearing assembly 44 for rotatably supporting the shaft 22 within the cylinder. In addition, the shaft 22 is rotatably supported by a second ball bearing assembly 46. The shaft 22 also has attached thereto a worm 48, which meshes with a worm wheel, or gear, 50. The worm gear 50 has an integral flange to which an annular toothed clutch member 52 is connected by means of projections as shown in Figure 2. The toothed clutch member 52 cooperates with a complementary toothed clutch member 54. The clutch member 54 is connected to rotate with a rotatable member, or screw shaft, 56 of the actuator as shown in Figure 2.

A ring piston 61 is slidably mounted on the cylinder 10, the piston 61 being urged to the left, as viewed in Figure 2, by a plurality of springs 63. Movement of the ring piston 61 to the left is limited by a stop ring 65. The ring piston 61 can be moved to the right, as viewed in Figure 2, by the application of pressure fluid to the annular servo chamber 67. The piston 61 is operatively connected with the axially movable clutch member 52 through the thrust bearing 69 such that when the servo chamber 67 is connected to drain, the spring 63 acting on the piston 61 effects movement of the clutch member 52 into engagement with the clutch member 54 through the thrust bearing 69. On the other hand, when the servo chamber 67 is pressurized, the ring piston 61 moves to the right to remove the thrust of springs 63 from the clutch member 52 thereby permitting the springs 71 to disengage the clutch member 52 from the clutch member 54.

The actuator also includes a piston 55, as shown in Figure 2, which is disposed within the cylinder and operatively connected to the screw shaft 56 through an integral nut 57 and circulating balls 59, such that relative linear movement between the piston and cylinder is dependent upon rotation of the screw shaft 56. Furthermore, in the manner disclosed in the aforementioned Patent 2,810,256, the motor driven shaft 14 may be connected to the motor armature through a solenoid operated clutch and brake assembly, not shown, which restrains rotation of the shaft 14 when the motor 12 is deenergized. In this manner, the motor renders the locking means, constituted by the toothed clutch members 52 and 54, operative to restrain rotation of the screw shaft 56, and, hence, prevent relative reciprocation between the piston and cylinder when the actuator is inactive. The means for releasing the locking means by disengaging the two clutch members 52 and 54 comprises the aforedescribed structure consisting of the ring piston 61, the servo chamber 67 and the springs 71.

In the disclosed embodiment, the actuator cylinder includes a fixture 58, which is pivotally attached at 60 to an L-shaped lever 62. The intermediate portion of the lever 62 is rotatably supported on a pivot 64, which is attached to a stationary support, not shown. The other end of the lever 62 is pivotally connected at 66 to the movable load device 68. The actuator piston 55, includes a rod portion 70, which projects through the end wall of the cylinder 10 and has attached thereto a fixture 72, which, in the instant embodiment, is attached to a fixed support 73, as shown in Figure 2. Thus, upon relative movement between the cylinder and piston, as effected by either the electric motor or fluid under pressure, the lever 62 will pivot about the pin 64 so as to effect movement of the load device 68.

The motor 12 is shown connected by a cable 74 to a relay box 76, which, in turn, is connected by a cable 78 to a suitable source of electric power, not shown. The relay box 76 may contain relays of the type shown in the aforementioned Patent 2,810,256. The relay box is also connected by conductors 80 and 82 to terminals 84 and 86, respectively, of a carbon pile assembly, designated generally by the numeral 88.

The carbon pile assembly 88 is of identical construction to that shown in the aforementioned Patent 2,810,256 and, thus, includes a plurality of carbon discs 90 having aligned apertures. The carbon discs are disposed within a casing 92 and insulated therefrom by any suitable means 94. The carbon discs 90 are electrically connected to conductive washers 96 and 98, and are initially preloaded by a coil spring 100. One end of the spring 100 abuts a washer 102, which abuts the washer 98. The other end of the spring 100 engages a shoulder 104 formed on a rod 106, which extends through the aligned openings in the carbon discs. The rod 106 is pinned at 108 to a rod 110, which abuts the washer 102, and is supported for reciprocable movement by a sleeve bearing 112. The rod 106 is threadedly connected to a nut 114 at the other end, which nut engages a washer 116 and is supported for reciprocable movement by a bearing 118. Rod member 120 of the carbon pile assembly 88, which abuts rod 106, is pivotally attached at 122 to a bellcrank 124, the intermediate portion of which is supported by pivot pin 64.

The rod 110 is pivotally connected at 126 to a manually positionable lever 128. Accordingly, from the aforegoing, it will be appreciated that when the lever 128 is pivoted about 126, the rod 110 and the rod 106 will be moved longitudinally, and pressure will be applied to the carbon discs 90 through the washers 102 or 116. In this manner, the carbon pile may be compressed so as to reduce the ohmic value thereof, and in this manner, proportional energization of the electric motor 12 may be effected.

The bellcrank 124 is connected by a pivot pin 130 to a rod 132, which is slidably supported for movement relative to the cylinder housing 10. The rod 132 connects with a spool valve element, not shown, disposed within a valve housing 133 for controlling fluid pressure operation of the actuator. In addition, the rod 132 is operatively connected to one end of a bellcrank 134, the intermediate portion of which is pivoted at 136 to the cylinder housing. The bellcrank 134 carries a contact 138, which is connected by a wire 140 to ground. Contact 138 is disposed between a pair of cylinder carried contacts 142 and 144. Contacts 142 and 144 are connected by wires 146 and 148, respectively, to the windings of the split series electric motor 12. Thus, when the contact 138 engages contact 142, the motor 12 will rotate in one direction, and when the contact 138 engages the contact 144, the motor will rotate in the opposite direction. Upon rotation of the armature of the motor 12 with the clutch members 52 and 54 engaged, rotation will be imparted to the screw shaft 56 through shaft 14, worm 16, worm gear 18, shaft 22, worm 48, worm gear 50, and the clutch parts 52 and 54. Rotation of the screw shaft 56 will result in linear movement of the cylinder assembly 10 thereby adjusting the load device 68 since the screw shaft threadedly engages the nut 57 integral with the stationary piston 55 through the circulating balls 59. Moreover, the degree of motor energization, and, hence, the speed of motor rotation will be determined by the force exerted on the carbon pile 88.

The other end of the bellcrank 134 is connected to the member 40, which is threadedly connected to the collar 36. Thus, the bellcrank 134 constitutes part of the load feedback means of the present invention, since in order to effect pivotal movement of the bellcrank 134 about pivot point 136, the shaft 22 must be moved axially through the collar 36 and thrust bearing assembly 24. Moreover, since the shaft 22 is directly connected to the actuator screw shaft 56 when the locking means are engaged, the connection being through worm 48 and worm gear 50, it will be appreciated that in order to close the circuit to the motor 12, the operator must, in the case of an opposing load, exert an effort sufficient to actually move the load manually throughout a very small distance. The amount of force required to effect manual rotation of the screw shaft is, of course, less than the actual load moved due to the mechanical advantage achieved by the reduction gearing. Conversely, in the case of an aiding load, the operator must exert a force of the opposite sense to control the actuator.

Furthermore, by reason of the contacts 142 and 144 being carried by the cylinder, it will be appreciated that the operator must continuously exert force on the manual control lever 128 to control actuator operation, since the contacts 142 and 144 operate in a follow-up manner in respect to the bellcrank carried contact 138. Furthermore, it will be appreciated that the load feedback means of the present invention afford the operator, in the case of an aircraft installation the pilot, a sense of proportional feel with respect to the load being moved by the actuator. This feature is highly desirable, especially in aircraft, as this sense of feel might very well avoid a serious mishap.

While the embodiment of the present invention as herein disclosed, constitutes a preferred form, it is to be understood that other forms might be adopted.

What is claimed is as follows:

1. Control apparatus for a power operated actuator having rotatable driving means, a rotatable driven member operatively connected to a load and means including a rotatable and axially movable shaft operatively connecting the driving means and the driven member whereby rotation will be imparted to said driven member upon either axial movement or rotation of said shaft, including, a manually positionable element for controlling operation of said driving means, and means interconnecting said element and said shaft for effecting axial movement of said shaft and rotary movement of said driven member to effect operation of said driving means, the construction and arrangement being such that a manual force proportional to the load on said driven member must be exerted to effect axial movement of said shaft.

2. Control apparatus for a power operated actuator having rotatable driving means, a rotatable driven member operatively connected to a load and means including a rotatable and axially movable shaft operatively connecting the driving means and the driven member whereby rotation will be imparted to said driven member upon either axial movement or rotation of said shaft, including, a manually positionable element for controlling operation of said driving means, and means including a bellcrank interconnecting said element and said shaft for effecting axial movement of said shaft and rotary movement of said driven member to effect operation of said driving means, the construction and arrangement being such that a manual force proportional to the load on said driven member must be exerted to effect axial movement of said shaft.

3. Control apparatus for a power operated actuator having rotatable driving means, a rotatable driven member operatively connected to a load, a rotatable and axial movable shaft, a first worm gear and a first worm wheel interconnecting one end of said shaft and said driving means, and a second worm and a second worm wheel interconnecting the other end of said shaft and said driven member whereby rotation will be imparted to said driven member by either axial movement or rotation of said shaft, including, a manually positionable element for controlling operation of said driving means, and means interconnecting said element and said shaft for effecting axial movement of said shaft and rotary movement of said driven member to effect operation of said driving means, the construction and arrangement being such that a manual force proportional to the load on said driven member must be exerted to effect axial movement of said shaft.

4. Control apparatus for a power operated actuator having rotatable driving means, a rotatable driven member operatively connected to a load, a rotatable and axial movable shaft, a first worm gear and a first worm wheel interconnecting one end of said shaft and said driving means, and a second worm and a second worm wheel interconnecting the other end of said shaft and said driven member whereby rotation will be imparted to said driven member by either axial movement or rotation of said shaft, including, a manually positionable element for controlling operation of said driving means, and means including a bellcrank interconnecting said element and said shaft for effecting axial movement of said shaft and rotary movement of said driven member to effect operation of said driving means, the construction and arrangement being such that a manual force proportional to the load on said driven member must be exerted to effect axial movement of said shaft.

5. An actuator assembly including in combination, rotatable driving means, a rotatable driven member, a rotatable and axially movable shaft, a first worm wheel having a straight spline connection with said shaft, a first worm drivingly engaging said first worm gear and connected to said driving means, a second worm rigidly connected to said shaft, a second worm wheel drivingly engaging said second worm and connected to said driven member whereby upon operation of said driving means rotation will be imparted through said first worm and first worm wheel to said shaft and through said second worm and second worm wheel to said driven member so as to position a load operatively connected to said driven member, the construction and arrangement being such that said shaft may be moved axially relative to said first worm wheel so as to impart rotary movement to said driven member through said second worm and second worm wheel, a manually positionable element for controlling operation of said driving means, and means interconnecting said element and said shaft for effecting axial movement of said shaft and rotary movement of said driven member to effect operation of said driving means, the construction and arrangement being such that a manual force proportional to the load on said member must be exerted to effect axial movement of said shaft.

6. The combination set forth in claim 5 wherein said last recited means includes a bellcrank, one end of which is operatively connected to said manually positionable element and the other end of which is operatively connected to said shaft through a thrust bearing assembly.

References Cited in the file of this patent

UNITED STATES PATENTS

| | | |
|---|---|---|
| Re. 23,692 | Vickers et al. | Aug. 4, 1953 |
| 2,330,569 | Esnault-Pelterie | Sept. 28, 1943 |
| 2,446,393 | Russell | Aug. 3, 1948 |
| 2,620,683 | Geyer | Dec. 9, 1952 |
| 2,810,256 | Geyer et al. | Oct. 22, 1957 |